(12) United States Patent
Klimek et al.

(10) Patent No.: US 6,198,538 B1
(45) Date of Patent: Mar. 6, 2001

(54) MATCH FILTER APPARATUS AND METHOD FOR REMOTE ULTRASONIC DETERMINATION OF THIN MATERIAL PROPERTIES

(75) Inventors: Daniel E. Klimek, Lexington; Petros A. Kotidis, Framingham, both of MA (US)

(73) Assignee: Textron Systems Corporation, Wilmington, MA (US)

( * ) Notice: Subject to any disclaimer, the term of this patent is extended or adjusted under 35 U.S.C. 154(b) by 0 days.

(21) Appl. No.: 09/289,569

(22) Filed: Apr. 9, 1999

Related U.S. Application Data

(60) Provisional application No. 60/081,314, filed on Apr. 10, 1998.

(51) Int. Cl.[7] .................................................. G01N 21/00
(52) U.S. Cl. ...................... 356/432; 356/243.1; 356/357; 374/161
(58) Field of Search .................................... 356/432, 357, 356/243.1, 243.7, 243.8, 32, 35.5, 43, 358, 351; 73/655, 657; 374/123, 161, 129, 133

(56) References Cited

U.S. PATENT DOCUMENTS

| | | | |
|---|---|---|---|
| 5,604,592 | 2/1997 | Kotidis et al. ...................... | 356/357 |
| 5,638,396 | * 6/1997 | Klimek ................................. | 372/92 |
| 5,781,304 | * 7/1998 | Kotidis et al. ...................... | 356/359 |
| 5,793,489 | * 8/1998 | Kotidis et al. ...................... | 356/357 |
| 5,798,835 | * 8/1998 | Kotidis et al. ...................... | 356/358 |
| 5,956,143 | * 9/1999 | Kotidis ................................. | 356/358 |
| 6,057,927 | * 5/2000 | Levesque et al. ............... | 356/432 T |

* cited by examiner

*Primary Examiner*—Hoa Q. Pham
(74) *Attorney, Agent, or Firm*—Samuels, Gauthier & Stevens LLP

(57) ABSTRACT

In an apparatus and method for remote ultrasonic determination of thin material properties, a match filter calibration technique is employed. For a plurality of known material property values and known material thicknesses, an elastic stress wave is generated in the material at a source location. The intensity of a signal generated by the elastic stress wave is sensed at a sense location positioned a known distance from the source location. A feature is selected from among the sensed signals which demonstrates minimal thickness dependents from a plurality of known material thicknesses. The selected feature is applied to the sensed signals to determine propagation time of the signals over the known distance. A calibration curve is then generated to characterize the relationship between signal propagation time and material property value for each material thickness. The present technique is especially amenable to determination of thin material properties, for example temperature, in a manner which is independent of material thickness. In an embodiment adapted for determination of temperature, precision on the order of ±1° C. is achievable over a range of material thicknesses.

48 Claims, 7 Drawing Sheets

MATCH FILTER APPARATUS AND METHOD FOR REMOTE ULTRASONIC DETERMINATION OF THIN MATERIAL PROPERTIES

RELATED APPLICATIONS

This application claims the benefit of U.S. Provisional Application Ser. No. 60/081,314, filed Apr. 10, 1998, the contents of which are incorporated herein by reference in their entirety.

BACKGROUND OF THE INVENTION

Semiconductor device fabrication involves a number of processes where temperature uniformity and control are critical. These processes include rapid thermal processing (RTP), chemical vapor deposition (CVD), physical vapor deposition (PVD), and plasma etch. The ability to measure and map the silicone wafer temperature during processing is an enabling technology for most modem processes, especially RTP.

Modern techniques for remote monitoring of semiconductor wafer temperature are generally ineffective. While thermocouples provide adequate precision, they require physical contact with the wafer for accurate measurement and hence, they disturb the temperature field and uniformity, and further provide a source of contamination. Optical pyrometry is a state-of-the-art technique for remote temperature analysis. However, pyrometers are inaccurate primarily because the temperature measurement is a strong function of emissivity which varies greatly with wafer coating, film growths, and depositions. Pyrometers are particularly ineffective at low temperatures. Furthermore, at high temperatures, heat lamps are commonly used during RTP. They generate bright light to heat the wafers with infrared radiation, which can cause false pyrometric readings.

Laser ultrasonics has recently been introduced as a means for remote temperature measurement of thin materials as described in U.S. Pat. No. 5,604,592, incorporated herein by reference. In this technique, a stimulus beam is incident on a portion of the silicon wafer.

The stimulus beam generates an ultrasonic, or elastic, stress wave which propagates along the body of the wafer. The elastic wave is remotely sensed by a sense beam at a sense location positioned at a known distance from the source location. The velocity of propagation between the stimulus location and the sense location is temperature-dependent. In this manner, the temperature of the wafer is determined as a function of propagation time, referred to in the art as "time of flight" (TOF) of the elastic wave. At present, the accuracy of laser ultrasound is limited to ±4° C. and therefore this technique is ineffective for modem RTP applications where an accuracy of ±3° C. is necessary and ±1° C. is desired. Furthermore, laser ultrasound is extremely sensitive to wafer thickness.

SUMMARY OF THE INVENTION

The present invention is directed to an apparatus and method for remote ultrasonic determination of thin material properties, for example temperature, using a match filter calibration technique. The present invention is especially amenable to determination of thin material properties in a manner which is independent of material thickness. In an embodiment adapted for determination of temperature, precision on the order of ±1° C. is achievable over a range of material thicknesses.

In a first aspect, the method of the present invention comprises a calibration technique for a system which determines a material property value of a thin material. For a plurality of known material property values and known material thicknesses, an elastic stress wave is generated in the material at a source location. The intensity of a signal generated by the elastic stress wave is sensed at a sense location positioned a known distance from the source location. A feature is selected from among the sensed signals which demonstrates minimal thickness dependence for the plurality of known material thicknesses. The selected feature is applied to the sensed signals to determine propagation time of the signals over the known distance. A calibration curve is then generated to characterize the relationship between signal propagation time and material property value for each material thickness.

In a preferred embodiment, the elastic stress wave is generated by launching a laser beam at a surface of the material. The elastic stress wave is preferably excited by point excitation, line excitation, arc excitation, semi-circle excitation, or ring excitation. The thin material preferably comprises a semiconductor wafer and the material property preferably comprises temperature.

The sensed signals used to generate the calibration curve preferably comprise discrete intensity samples of the signal as a function of time. The selected feature preferably comprises a feature in the signals having a defined starting time and a defined duration. Application of the selected feature to the sensed signals to determine propagation time preferably comprises a cross-correlation of the selected feature with each signal to generate correlation data corresponding to each signal. The propagation time of the signal is then determined as the time where the selected feature best correlates with the signal.

Cross-correlation preferably comprises, for each of a plurality of time positions, computation of a sum of products between the respective intensities of the selected feature and each signal to generate correlation data. A polynomial is fit to the correlation data for each signal. The relative peak of the polynomial is determined and the peak value is evaluated to determine a corresponding propagation time value.

Generation of the calibration curve preferably comprises fitting a polynomial to the calibration data to characterize the behavior of propagation time as a function of material property value for each material thickness. The polynomial is compared to the determined propagation time data at each material property value to determine a residual value at each data point. The standard deviation of the residual data is computed, characterizing the effectiveness of the feature.

In a preferred embodiment, the steps of selecting a feature, applying the selected feature, and generating a calibration curve are performed in an iterative process to determine an optimal selected feature for characterizing the sensed signals. In this embodiment, the standard deviation of the residual data is calculated at each iteration and an optimal feature is determined as the feature having the lowest standard deviation value. The optimal feature is preferably applied to the sensed signals to generate a calibration curve based on the optimal feature.

Following computation of the calibration curve, the curve and its associated selected feature can be applied to signal measurements generated in a material of unknown thickness and unknown material property value for determining the material property value, independent of material thickness. An elastic stress wave is generated in the material of unknown thickness and unknown material property value.

The intensity of a measured signal generated by the elastic stress wave is sensed at a sense location positioned a known distance from the source location. The selected feature is applied to the measured signal to determine propagation time of the measured signal. The propagation time of the measured signal is, in turn, applied to the calibration curve to determine the corresponding material property value. Application of the selected feature to the measured signal to determine propagation time preferably comprises cross-correlation of the selected feature with the measured signal to generate correlation data corresponding to each signal and determination of the propagation time of the signal as the time where the selected feature best correlates with the signal.

The present invention may be applied to generate a calibration curve and selected feature for a plurality of material thickness ranges. Each signal feature and calibration curve combination is applicable to at least one of the thickness ranges.

In a second aspect, the method of the present invention is directed to a method for determining a material property value, for example temperature, of a thin material. An elastic stress wave is generated in a material of unknown thickness and unknown material property value at a source location. The intensity of a measured signal generated by the elastic stress wave is sensed at a sense location positioned a known distance from the source location. A selected feature is applied to the measured signal to determine propagation time of the measured signal. The selected feature is determined by a calibration method.

In the calibration method, a test elastic stress wave is generated in the material at a source location for a plurality of known material property values and known material thicknesses. The intensity of test signal generated by the test elastic stress wave is sensed at a sense location positioned a known distance from the source location. A feature from among the sensed test signals is selected which demonstrates minimal thickness dependence for the plurality of known material thicknesses. The selected feature is applied to the sensed test signals to determine propagation time of the test signals over the known distance. A calibration curve is generated to characterize the relationship between signal propagation time and material property value for each material thickness.

The propagation time of the measured signal is applied to the calibration curve determined by the calibration method defined above to determine the corresponding material property value.

In a preferred embodiment, application of the selected feature to the measured signal to determine propagation time comprises cross-correlation of the selected feature with the measured signal to generate correlation data corresponding to each signal for a plurality of discrete propagation time values. The propagation time of the signal is determined as the time where the selected feature best correlates with the signal. To determine the best correlation, for each of a plurality of time positions, a sum of products is computed between the respective intensities of the selected feature and each signal to generate correlation data. A polynomial is then fit to the correlation data for each signal. The relative peak of the polynomial is determined, and the peak value is interpolated to determine a corresponding propagation time value.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
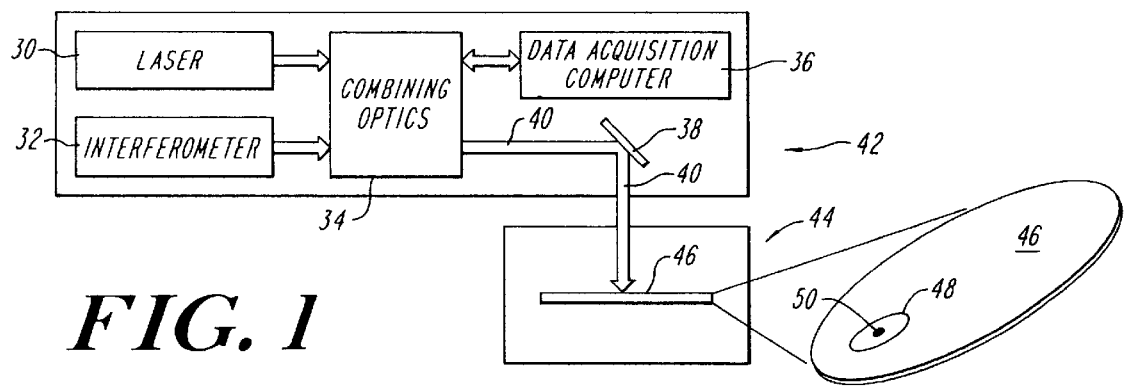
FIG. 1 is a schematic block diagram of the primary components of the system of the present invention.

FIG. 1 is a schematic block diagram of the primary components of a preferred embodiment of the present invention. The temperature monitoring system 42 comprises a laser 30, for example an impulse laser, a polarizing interferometer 32, combining optics 34, and a computer 36 for acquiring and processing data. In a preferred embodiment, the calibration computations described herein are performed by computer 36. The optics 34 generate a laser beam 40 which is directed by directing optics 38 into a processing oven 44 where silicon wafers 46 are processed. When the output beam 40 strikes the wafer 46, ultrasonic waves are generated in the wafer material. For example, the laser may comprise a Nd:YAG laser (532 nm wavelength) pumped by a flashlamp and doubled with a doubling crystal having a 10 nsec pulse energy, operating at 10 pulses per second. Pulse energy is preferably on the order of 20 mJ per pulse.

The ultrasound signal is detected using a polarizing interferometer 32, for example a polarizing interferometer equipped with a diode-pumped continuous wave Nd:YAG probe laser of wavelength 1064 nm. The two laser beams, source beam and sense beam, are prepared and combined into a coaxial configuration and directed to the sample 46. Reflected probe laser power returns to the interferometer combined with an inertial reference beam, and is sent to a photodiode detector. The intensity signal from this detector portrays the surface displacement caused by the ultrasound wave created by the impulse laser. The signal is sent to the data acquisition computer 36 where the information is processed.

In a preferred embodiment, the well-characterized technique of ring excitation is employed. The purpose of the combining optics 34 in this embodiment is to modify the impulse laser beams output from laser 30 so that when the resulting output beam 40 is focused on the silicon wafer 46, the beam 40 is in the form of a sharp ring 48. An axicon is used for this purpose. In this manner, the output beam 40 launches an elastic stress wave, which generates an ultrasound signal converging toward the detection probe point 50 located in the center of the ring. This arrangement confers several advantages over other well-known excitation techniques, including point excitation and line excitation. Advantages include improved signal-to-noise ratio, and a minimal amount of laser energy deposited on the wafer 46. A preferred ring 48 diameter is 2.54 cm. This diameter is considered an optimal tradeoff between the requirement for temporal feature resolution and the need to localize the interrogation zone. Smaller and larger measurement areas are equally applicable to the present invention. Alternatives to ring excitation include arc excitation and semi-circle excitation, which offer the advantages of a pulse converging effect, as in ring excitation.

In general, laser energy absorbed on the surface of the material generates several types of ultrasonic waves; some of them penetrate into the material, while others propagate along the surface. The surface waves involve a displacement transverse to the direction of motion. These waves, referred to as Rayleigh waves, are generated when the material is much thicker than the ultrasound wavelength.

When thin materials, or plates, are excited, both the upper and lower surfaces of the material become involved in wave generation and waves referred to as Lamb waves result. Lamb waves have a strong dispersive behavior. There are two basic modes of Lamb waves, symmetric and anti-symmetric. Illustration of the zeroth order form of these modes are given in FIG. 2. The behavior of these modes is well characterized and understood by those skilled in the art.

For purposes of the present invention, the term "thin material" or "thin wafer", as used herein, is defined as a material which is sufficiently thin, such that when the material is excited by a transduction event, Lamb waves are generated in the material, as opposed to Rayleigh waves.

Figure 2:
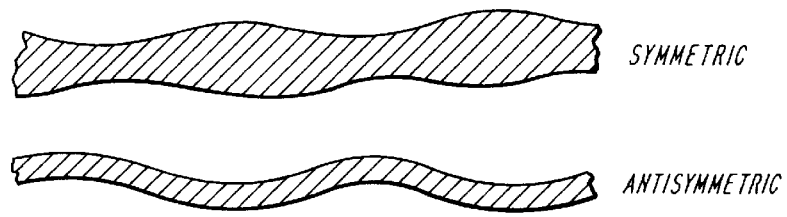
FIG. 2 is an illustration of symmetric and anti-symmetric Lamb modes in accordance with the present invention.

The laser induces an ultrasound pulse in the wafer 46 that includes many frequencies. Ultrasound propagation through thin plates is characterized by means of Lamb modes. Lamb modes cause complex interactions between longitudinal and shear displacement waves reflecting between the surfaces of the plate. As illustrated in FIG. 2, Lamb modes can be characterized as either symmetric or anti-symmetric, referring to the symmetry of transverse displacements of the material relative to a plane parallel to and halfway between the two surfaces. Lamb modes are multi-modes in the sense that they include zeroth order and higher order modes. Because of the dispersive nature of Lamb waves and the characteristics of the anti-symmetric mode, the signal is distributed with respect to time; high-frequency waves arrive at the interrogation point 48 earlier than low-frequency waves. The relationship between frequency and velocity is complex and depends on the type and order of the mode involved. In a laser ultrasound apparatus, the duration of the impulse laser is short, on the order of 10 nsec, and the focal dimensions can be small, on the order of 50–200 microns. The consequence of this impulse excitation is that many frequencies are excited. This, coupled with the dispersive nature of plate mode propagation results in a complex signal shape.

Figure 3:
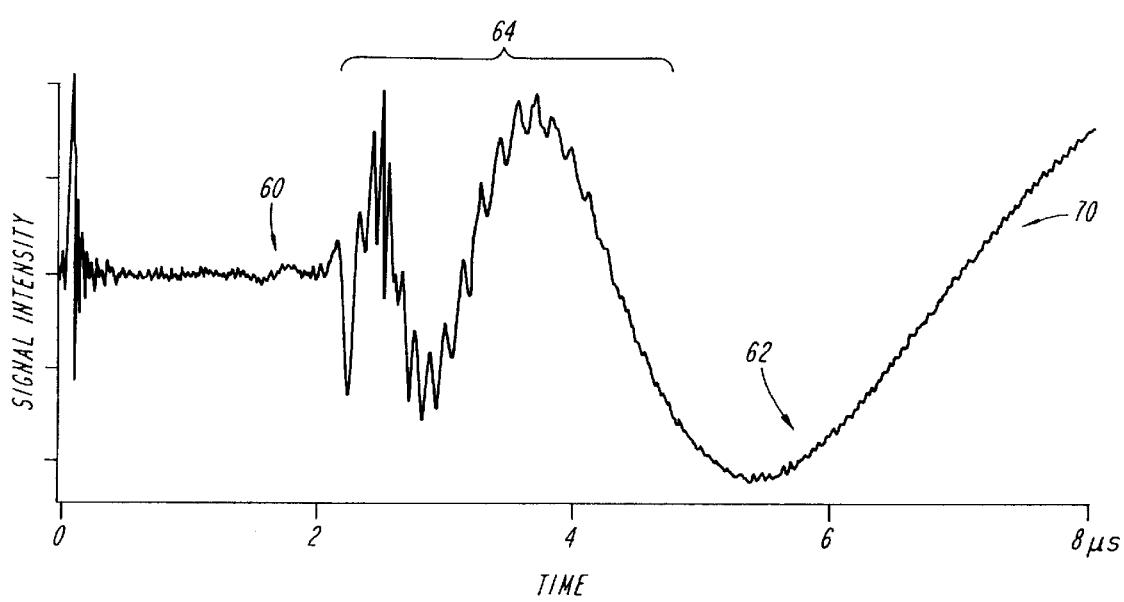
FIG. 3 is a chart of signal intensity as a function of time for a typical detected signal in accordance with the present invention.

A typical laser ultrasound signal shape 70 generated by axicon-formed ring excitation is shown in FIG. 3, which is a chart of signal intensity as a function of time. At time 0 $\mu$s, a transduction event takes place, introducing an elastic stress wave in the material along the perimeter of the ring 48. A sensor, for example a sense beam 50 positioned at the center of the ring 48 receives a first displacement signal 60 which is observed at approximately 1.4 $\mu$s. This is indicative of the arrival of the lowest order symmetric mode ($S_0$). The low-frequency modulation 62 continuing beyond a time of 6 $\mu$s is the lowest order anti-symmetric mode ($A_0$). The signal portion 64 ranging from 1.4 to 5 $\mu$s is a function of a combination of higher-order symmetric and anti-symmetric modes.

The velocity of ultrasound varies considerably as a function of angle through the cubic crystal structure of silicon. Longitudinal velocity changes by about 10% and shear velocity varies by about 25%. This, coupled with the fact that ring excitation is preferred, means that the signal pattern observed is a sum of many such patterns for each angle of propagation from the ring 48 to the central detection point 50. Although, from a conceptional point of view, it may be preferred to employ simple and well-characterized signals, this simplicity is outweighed by the advantages of ring excitation, which produces the best possible signal-to-noise ratio. High signal-to-noise ratio is necessary because of the accuracy and precision to which the signal features are measured. The converging Lamb wave created by the ring provides a signal of sufficient quality. Modem RTP furnaces employ a rotating wafer configuration. Ring excitation is well suited for such a configuration. Because of the level of accuracy required, it is difficult to determine the precise angle of the wafer that was present during measurement. By averaging over all angles, the resulting signal has minimal dependence on wafer orientation. Any residual dependence due to non-uniformity of the ring is removed by averaging over several measurements taken as the wafer is rotated through 90 degrees. Furthermore, using only a single angle would restrict the rate at which one could accumulate the number of signals comprising the average signal used to evaluate temperature. With single angle measurements, signals can only be obtained once every 90 degrees of rotation.

As stated above, Lamb modes are made up of complex interactions between longitudinal and shear displacement waves reflecting between the surfaces of the plate. Since both surfaces are involved, the separation between the surfaces or wafer thickness, strongly influences their character. The group velocity dispersion curves, which describe the change in velocity for each mode as a function of frequency, are actually a function of the frequency time thickness product. Although average wafer thickness in any given batch of wafers is known, variation in the thickness may be on the order of 1–2%. Since the pattern of the signal is strongly influenced by thickness, the methods of temperature evaluation must take this in to account.

It is well-known that the elastic properties of silicon vary slightly with temperature. In other words, there is a very subtle change in the propagation velocity of a signal through the silicon as a function of temperature. For example, in a standard silicon wafer, the velocity of propagation may change by a factor of $3.2 \times 10^{-5}$ per °C. Assuming that this degree of accuracy is required, this is a challenging task when considering that any jitter, or variation in the source beam or sense beam will result in a large amount of jitter in the velocity measurement. For example, a jitter in distance of 0.78 micron results in a jitter in temperature measurement of 1° C. Furthermore, accuracy in time is also needed. As an example, a 0.16 nsec time jitter results in jitter in temperature measurement of 1° C. Since the silicon wafer is to be measured at a sensitivity of $3.2 \times 10^{-5}$° C., accurate temperature measurement is a very challenging task.

The present invention is directed to an apparatus and method for calibrating a system for determining a material property value, for example temperature, of a thin material in a thickness-independent matter, and further to a system for applying measured data to a system calibrated according to the calibration technique for thickness-independent material property value measurement. For purposes of the present invention, the technique shall be referred to herein as the "match filter" technique. In the match filter method, the relative time of flight (TOF) of a signal is measured using a match filter and then, and using a previously-evaluated calibration function, converted to temperature.

Figure 10:
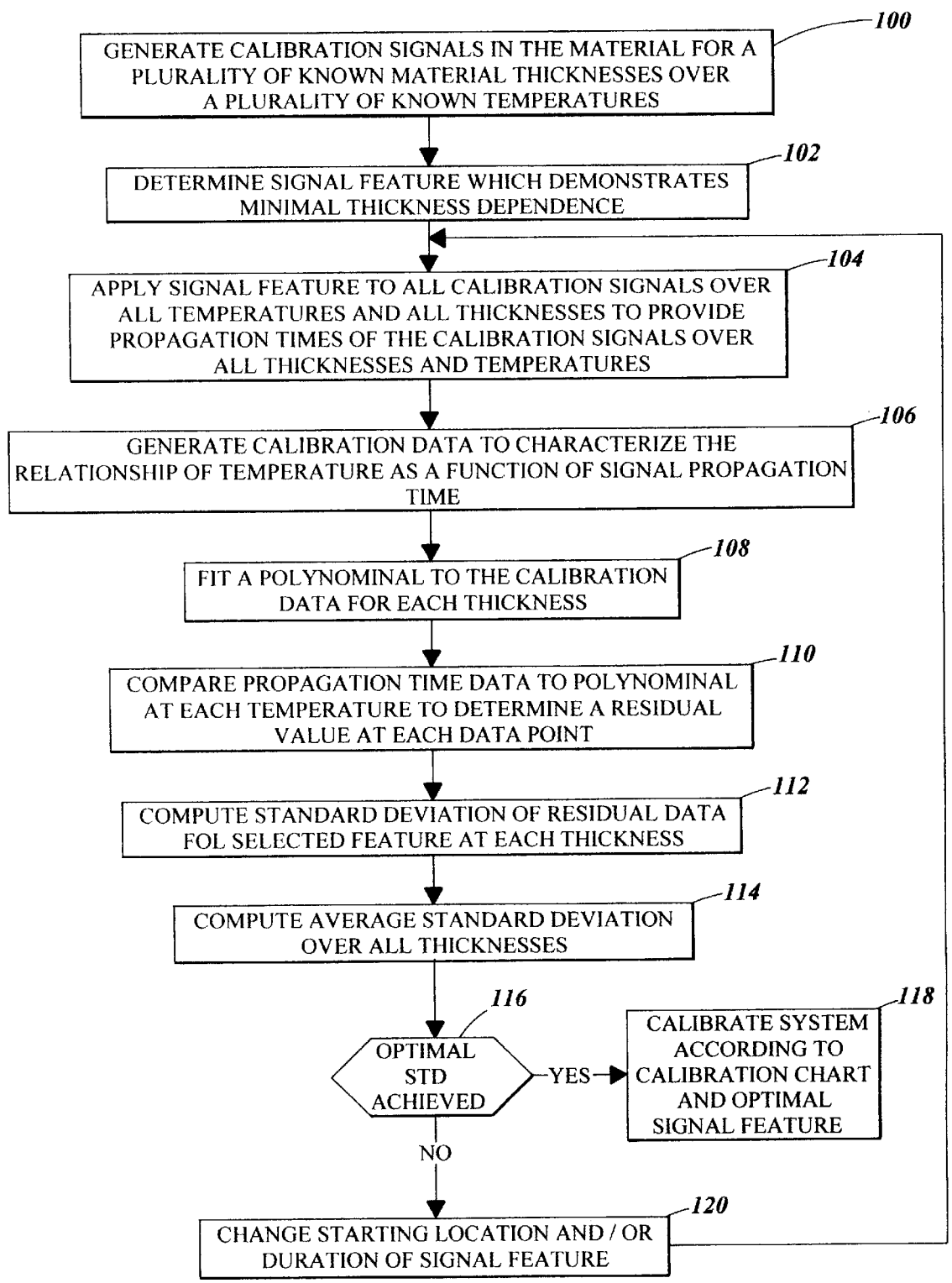
FIG. 10 is a flow diagram of the steps involved in calibrating a system using match filter techniques in accordance with the present invention.

FIG. 10 is a flow diagram illustrating the steps of the match filter technique of the present invention. For purposes of the following description, it will be assumed that the material property value being measured is temperature and the thin material comprises a silicon wafer undergoing fabrication. It is understood however that the present invention applies to determination of a number of material property values, including temperature, material hardness, material composition, pressure and residual stress.

Figure 4:
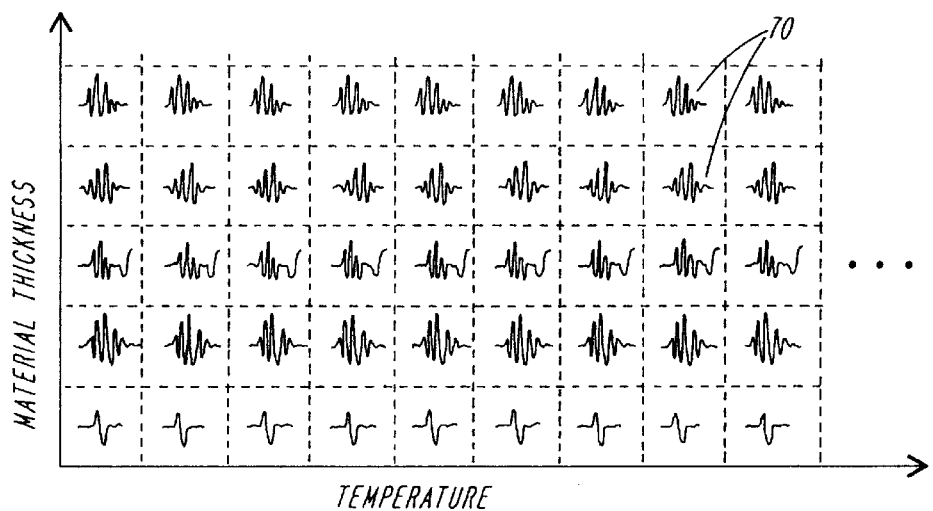
FIG. 4 is a chart of calibration signals measured as a function of varying material thickness and varying temperature in accordance with the present invention.

In a first step 100 of the match filter calibration technique of the present invention, calibration signals are generated in the silicon wafer for a plurality of known wafer thicknesses over a plurality of known temperatures. A number of test wafers of varying thicknesses are installed in the oven 46 and heated to a specified temperature over a range of temperatures expected during the fabrication process, for example 400–800° C. At each temperature, an elastic stress wave is generated in the silicon wafer at a source location and the intensity of the resulting signal generated by the elastic stress wave is sensed at a sense location. In a preferred embodiment, this is accomplished by ring excitation. The sense location is positioned a known distance from the source location according to well-known laser ultrasonic techniques. The signals are collected and stored digitally, for example in a computer file or memory, as shown in FIG. 4, which is a matrix of calibration signals 70 measured over a plurality of known material thicknesses and a plurality of known temperatures. The temperature may be accurately monitored, for example by using a thermocouple mounted to the wafer.

Calibration signals may alternatively be computed according to the techniques described in U.S. patent application Ser. No. 09/288,887, "Apparatus and Method for Remote Ultrasonic Determination of Thin Material Properties Using Signal Correlation," by Brian W. Anthony, Petros A. Kotidis. Daniel E. Klimek, and Agostino Abbate, filed of even date herewith, and commonly owned with the present application by the Applicant, incorporated herein by reference.

In the next step 102, a signal feature, also referred to herein as a match filter, is selected which demonstrates minimal thickness dependance when compared against the plurality of calibration signals 70. The signal feature 72 is of a starting time $t_0$, and of a duration $\Delta t$.

Figure 5:
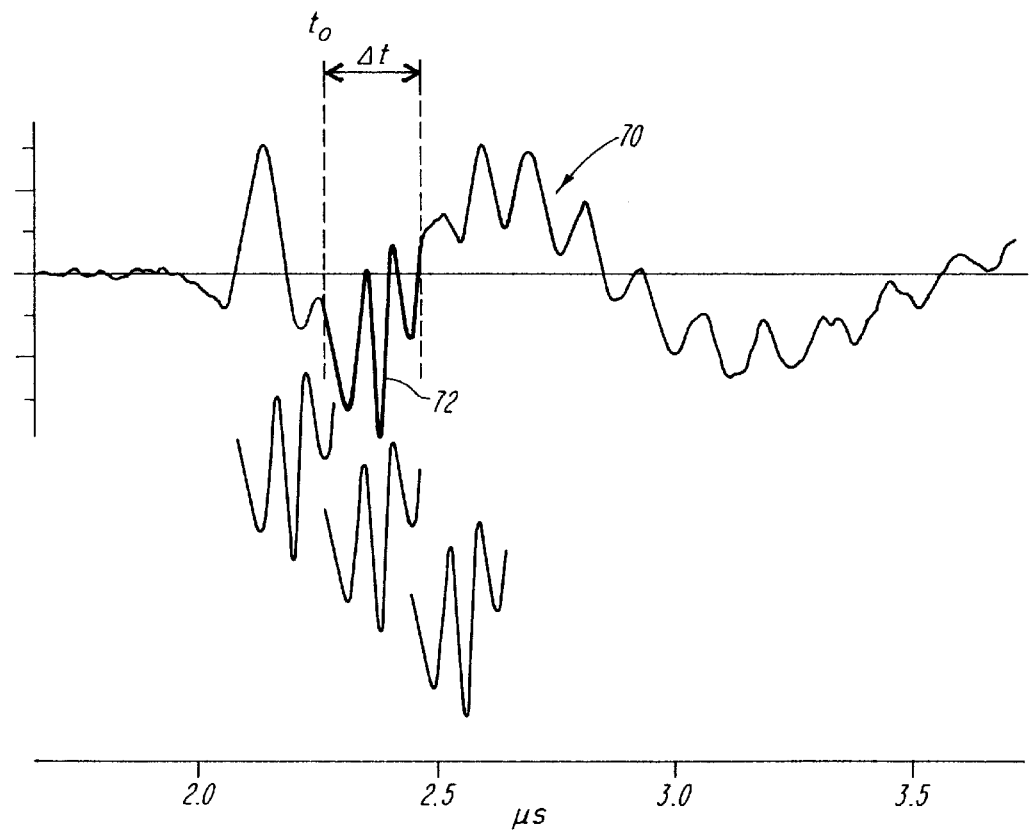
FIG. 5 is an illustration of a selected feature, for example a match filter, applied to a calibration signal to determine time of flight in accordance with the present invention.
Figure 6:
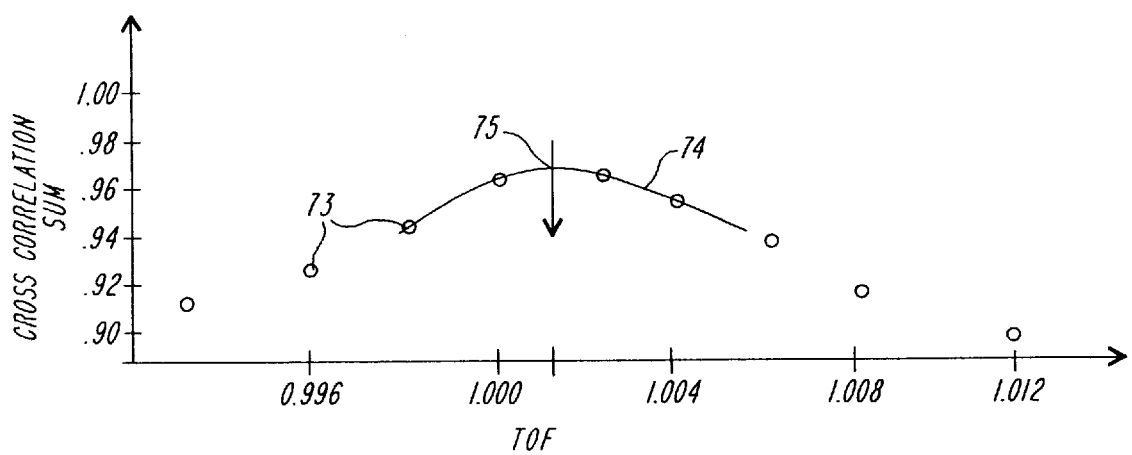
FIG. 6 is a chart of normalized cross correlation sum as a function of normalized time of flight in accordance with the present invention.
Figure 7:
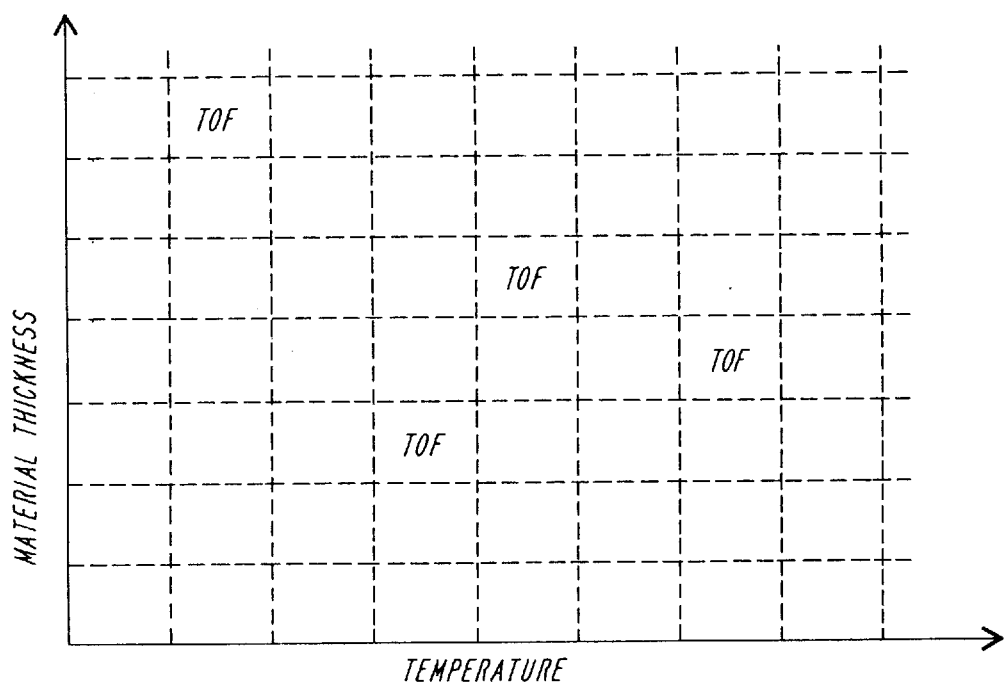
FIG. 7 is a chart of time of flight as a function of varying material thickness and varying temperature in accordance with the present invention.

In the next step 104, the selected signal feature 72, as shown in FIG. 5, is applied to all calibration signals 70 over all material thicknesses and all temperatures using a cross-correlation technique. The signal feature 72 is incrementally swept across each signal 70 at a plurality of discrete time values. At each time value, a cross-correlation function is performed and a cross-correlation sum is determined. This sum is represented by the following equation:

$$Sum_i = \Sigma_j filter_j \times signal_{(i+j)} \quad (1)$$

where the index I represents position in time, and j represents points in the filter. The value of the sum is a measurement of the quality of the fit of the filter 72 to the signal 70 at that position in time. By normalizing the cross-correlation sums at each starting time, a chart as given in FIG. 6 can be generated which is illustrative of the cross-correlation sum for the filter 72 applied to signal 70 at various starting times $t_0$ the starting times are normalized in the chart of FIG. 6. The cross-correlation sum data points 73 generally follow the shape of a polynomial, for example a parabola 74. Using a polynomial fit technique, the polynomial 74 can be generated and the relative peak 75 determined. The time value corresponding to that peak 75 is indicative of the relative time of flight (TOF) where the best correlation between the match filter 72 and the signal 70 occurs. In this manner, by applying the match filter 72 to all calibration signals 70, a time of flight, or propagation time, of the signals 70 can be determined for each calibration signal 70. This results is a matrix of data as shown in FIG. 7, representative of time of flight (TOF) of the various signals as a function of varying material thickness, and varying temperature.

Figure 8:
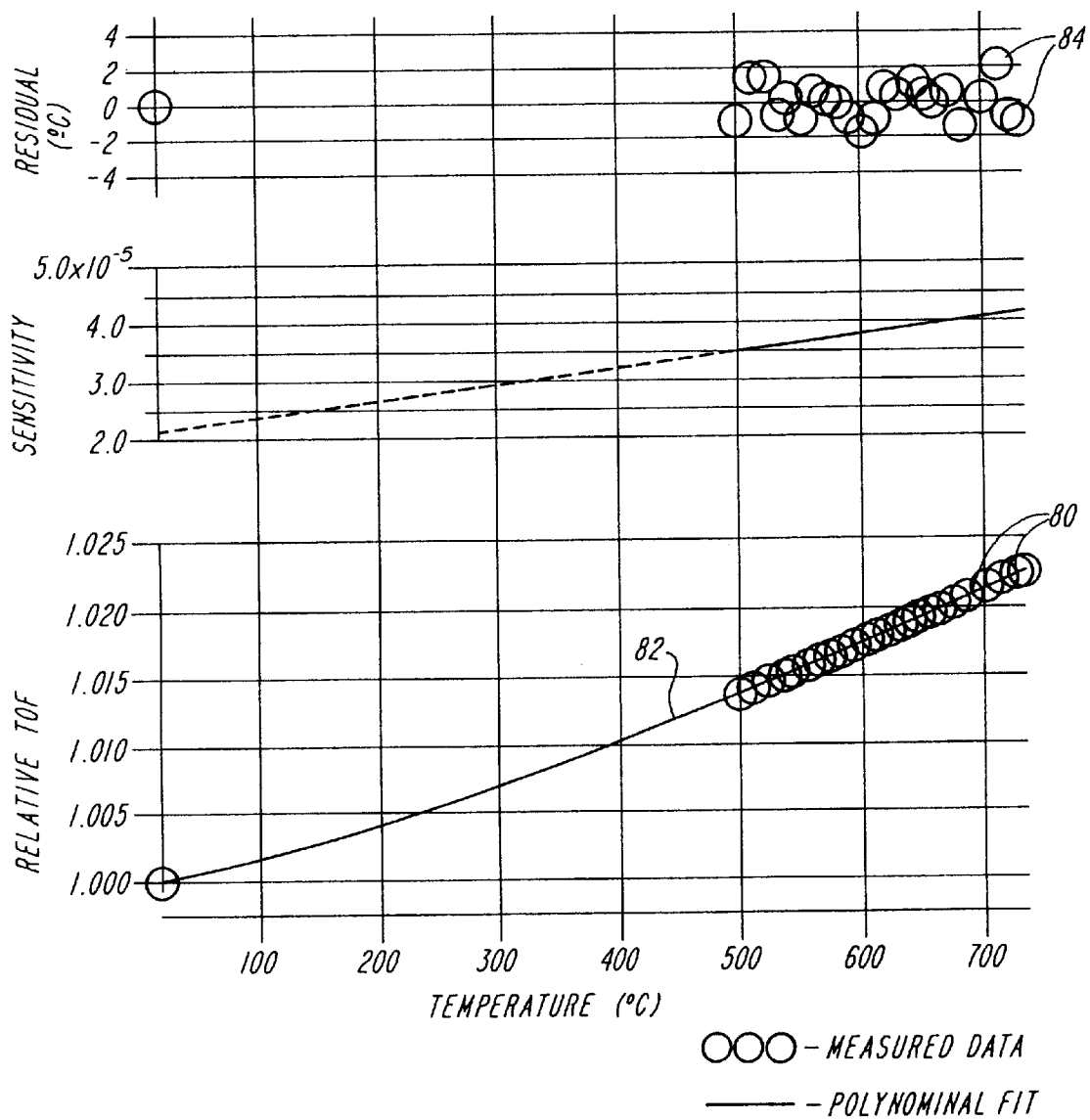
FIG. 8 is a chart of relative time of flight, sensitivity, and residual as a function of temperature in accordance with the present invention.
Figure 9:
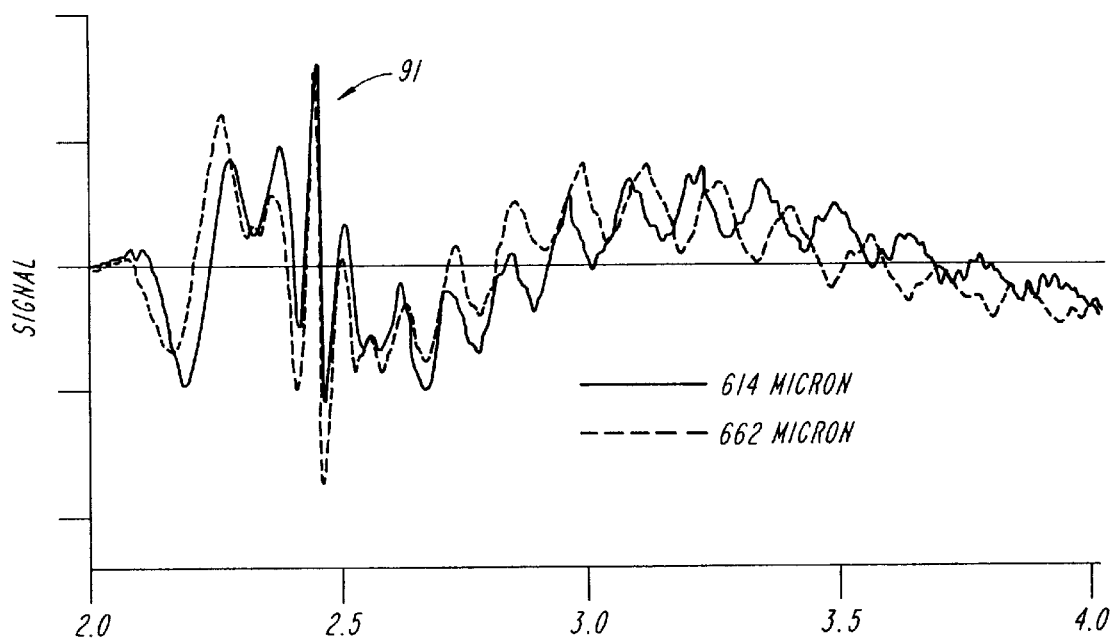
FIG. 9 illustrates a measured signal for two silicon wafer thicknesses, indicating the thickness-independent zone in accordance with the present invention.

In the next step 106 of the present invention, the time of flight data is normalized and charted as a function of temperature as shown in FIG. 8 for each material thickness. Each data point 80 is representative of the normalized relative TOF is a function of temperature.

In step 108 a polynomial 82 is fit to the calibration data 80 and the deviation of the measured data 80 from the calibration curve 82 is calculated to determine a residual value 84 corresponding to each calibration data point 80, as shown in step 110. In step 112, the standard deviation of the set of residual data 84 is determined for each wafer thickness. Following computation of standard deviation for each thickness, the average standard deviation over all thicknesses is determined in step 114. The average standard deviation characterizes the thickness-independent effectiveness of the selected feature for determining temperature.

The present invention performs an iterative procedure for determining whether the optimal standard deviation of the residual has been achieved 116. At each iteration, the starting location and/or duration of the signal feature 72 is altered in step 120, and that altered signal feature is reapplied to the calibration method. The resulting standard deviation values at each iteration are compared to determine an optimal value, derived from an optimal calibration curve and an optimal match filter.

Upon determination of the optimal standard deviation value 116, in step 118, the system is calibrated according to the calibration chart 82 and signal feature 72 corresponding to the optimal standard deviation value. Following calibration, the calibrated system can be employed for determining the temperature of a thin material over a range of thicknesses. An elastic stress wave is generated in a material of unknown thickness and unknown temperature at a source location. The intensity of a measured signal generated by the elastic stress wave is sensed at a sense location positioned a known distance from the source location. The optimal match filter is applied to the measured signal to determine the propagation time (TOF) of the measured signal. The TOF of the measured signal is, in turn, applied to the calibration curve to determine the corresponding temperature.

While this invention has been particularly shown and described with references to preferred embodiments thereof, it will be understood by those skilled in the art that various changes in form and details may be made therein without departing from the spirit and scope of the invention as defined by the appended claims.

For example, although the above description utilizes ring, line, and point excitation by launching a laser beam at a surface of the thin material, additional techniques may be used to enhance system performance.

In a first technique referred to herein as edge excitation, assuming the thin material to comprise a disk or wafer 201, an excitation laser beam 200, 206 impinges a line 202, or a point 208, respectively, on an edge of the disk 201. As stated above, elastic stress waves are generated, which in turn generate an ultrasound signal to be detected at the detection probe point 204, 210. By exciting the edge of the thin material, the antisymmetric mode $A_0$ is suppressed and the preferable thickness-independent symmetric mode is energized, leading to more accurate results.

Figure 11A:
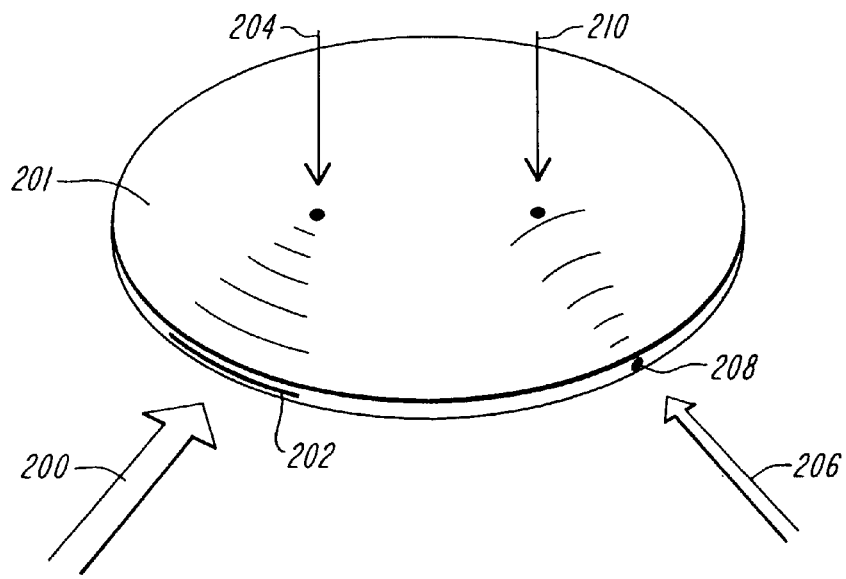
FIGS. 11A and 11B illustrate edge excitation and simultaneous lower and upper surface excitation, in accordance with the present invention.
Figure 11B:
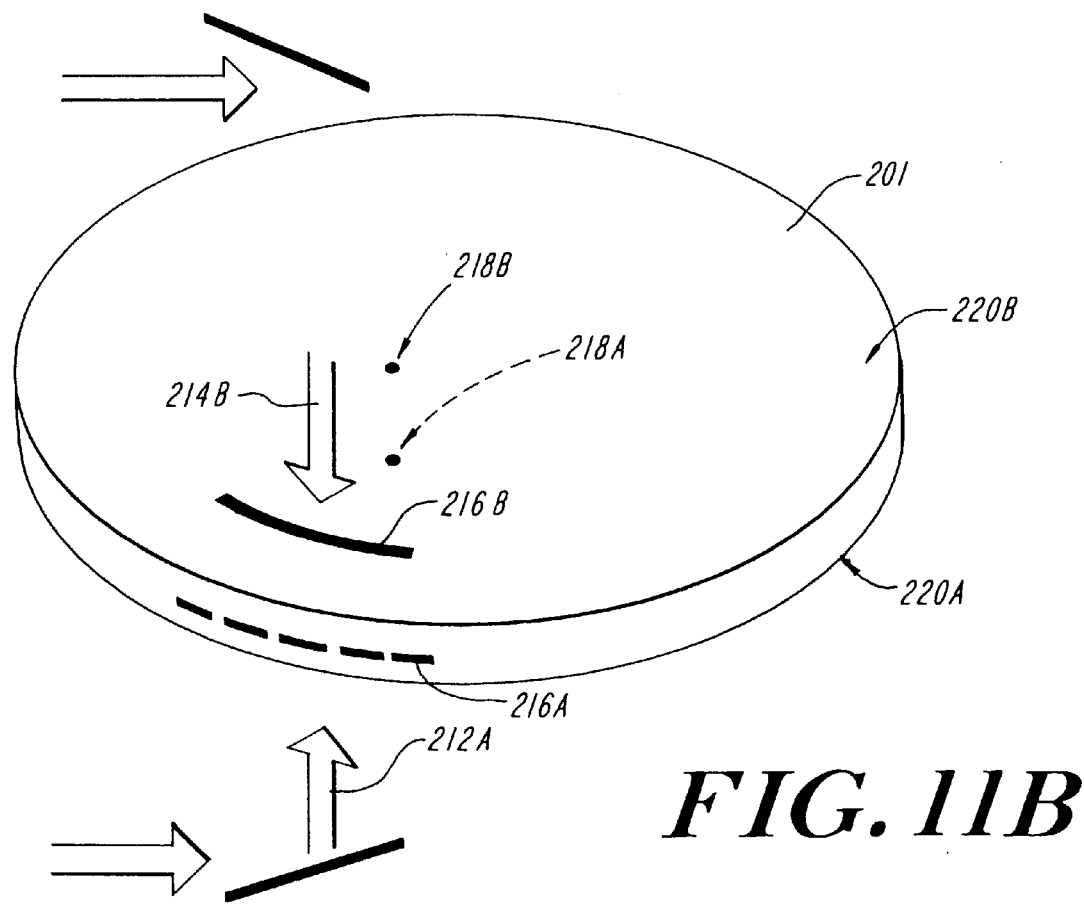

Alternatively, as shown in FIG. 11B, both top and bottom surfaces of the thin material can be excited simultaneously to selectively excite modes that provide optimal thickness independence and sensitivity. In this embodiment, first and second beams 212A, 212B, impinge on disk 201 at first and second surfaces respectively 220A, 220B. Although line excitation 216A, 216B is shown, other forms of excitation, for example point, semi-circle, arc, and ring excitation may be employed. The resulting ultrasonic waves are sensed at first and second detection points 218A, 218B on opposite surfaces of the material, as described above.

We claim:

1. A method for calibrating a system for determining a material property value of a thin material over a range of thicknesses comprising:

for a plurality of known material property values and known material thicknesses, generating an elastic stress wave in the material at a source location; and sensing the intensity of a signal generated by the elastic stress wave at a sense location positioned a known distance from the source location;

selecting a feature from among the sensed signals which demonstrates minimal thickness dependence for the plurality of known material thicknesses;

applying the selected feature to the sensed signals to determine propagation time of the signals over the known distance; and generating a calibration curve to characterize the relationship between signal propagation time and material property value for the range of material thicknesses.

2. The method of claim 1 wherein generating an elastic stress wave comprises launching a laser beam at a surface of the material.

3. The method of claim 2 further comprising exciting the elastic stress wave by an excitation technique selected from the group of excitation techniques consisting of point excitation, line excitation, arc excitation, semi-circle excitation, and ring excitation.

4. The method of claim 2 further comprising launching the laser beam at top and bottom surfaces of the material simultaneously and sensing at corresponding first and second sense locations.

5. The method of claim 1 wherein the thin material comprises a semiconductor wafer.

6. The method of claim 1 wherein the sensed signals comprise the intensity of the signal as a function of time and wherein selecting a feature comprises selecting a feature in the signals having a defined starting time and a defined duration.

7. The method of claim 1 wherein applying the selected feature to the sensed signals to determine propagation time comprises:

for a plurality of discrete propagation time values, cross-correlating the selected feature with each signal to generate correlation data corresponding to each signal; and determining the propagation time of the signal as the time where the selected feature best correlates with the signal.

8. The method of claim 7 wherein cross-correlating comprises:

for each of a plurality of time positions, computing a sum of products between the respective intensities of the selected feature and each signal to generate correlation data; and fitting a polynomial to the correlation data for each signal.

9. The method of claim 8 wherein determining the propagation time of the signal comprises determining the relative peak of the polynomial to determine a corresponding propagation time value.

10. The method of claim 1 wherein generating a calibration curve further comprises:

fitting a polynomial to characterize the behavior of propagation time as a function of material property value for each material thickness;

comparing the polynomial to the determined propagation time data at each material property value to determine a residual value at each data point;

computing the standard deviation of the residual data which characterizes the effectiveness of the selected feature for each thickness;

computing the average standard deviation over all thicknesses.

11. The method of claim 1 wherein the steps of selecting a feature, applying the selected feature, and generating a calibration curve are performed in an iterative process to determine an optimal selected feature for characterizing the sensed signals.

12. The method of claim 11 wherein generating a calibration curve further comprises:

fitting a polynomial to characterize the behavior of propagation time as a function of material property value for each material thickness;

comparing the polynomial to the measured propagation time data at each material property value to determine a residual value at each data point;

computing the standard deviation of the residual data which characterizes the effectiveness of selected feature.

13. The method of claim 12 wherein the optimal feature is determined as the feature having the lowest standard deviation value.

14. The method of claim 11 further comprising applying the optimal feature to the sensed signals to generate a calibration curve based on the optimal feature.

15. The method of claim 1 further comprising:

following computation of the calibration curve, generating an elastic stress wave in a material of unknown thickness and unknown material property value at a source location; and sensing the intensity of a measured signal generated by the elastic stress wave at a sense location positioned a known distance from the source location;

applying the selected feature to the measured signal to determine propagation time of the measured signal;

applying the propagation time of the measured signal to the calibration curve to determine the corresponding material property value.

16. The method of claim 15 wherein applying the selected feature to the measured signal to determine propagation time comprises:

for a plurality of discrete propagation time values, cross-correlating the selected feature with the measured signal to generate correlation data corresponding to each signal; and determining the propagation time of the signal as the time where the selected feature best correlates with the signal.

17. The method of claim 1 further comprising, for a plurality of material thickness ranges, selecting a corresponding plurality of signal features and generating a corresponding plurality of calibration curves, each signal feature and calibration curve combination being applicable to at least one of the thickness ranges.

18. The method of claim 1 wherein the material property comprises a property selected from the group consisting of temperature, hardness, composition, crystal orientation, pressure, grain size, and residual stress.

19. The method of claim 1 further comprising exciting the elastic stress wave by launching a laser beam at an edge of the material and sensing at a sense location on a surface of the material.

20. A method for determining a material property value of a thin material over a range of thicknesses comprising:

generating an elastic stress wave in a material of unknown thickness and unknown material property value at a source location; and sensing the intensity of a measured signal generated by the elastic stress wave at a sense location positioned a known distance from the source location;

applying a selected feature to the measured signal to determine propagation time of the measured signal, the selected feature being determined by a calibration method comprising:

for a plurality of known material property values and known material thicknesses, generating an test elastic stress wave in the material at a source location; and sensing the intensity of a test signal generated by the test elastic stress wave at a sense location positioned a known distance from the source location;

selecting a feature from among the sensed test signals which demonstrates minimal thickness dependence for the plurality of known material thicknesses;

applying the selected feature to the sensed test signals to determine propagation time of the test signals over the known distance; and generating a calibration curve to characterize the relationship between signal propagation time and material property value for the range of material thicknesses; and applying the propagation time of the measured signal to the calibration curve to determine the corresponding material property value.

21. The method of claim 20 wherein applying the selected feature to the measured signal to determine propagation time comprises:

for a plurality of discrete propagation time values, cross-correlating the selected feature with the measured signal to generate correlation data corresponding to each signal; and determining the propagation time of the signal as the time where the selected feature best correlates with the signal.

22. The method of claim 21 wherein cross-correlating comprises:

for each of a plurality of time positions, computing a sum of products between the respective intensities of the selected feature and each signal to generate correlation data; and fitting a polynomial to the correlation data for each signal.

23. The method of claim 22 wherein determining the propagation time of the measured signal comprises:

determining the relative peak of the polynomial to determine a corresponding propagation time value.

24. The method of claim 20 wherein the material property comprises a property selected from the group consisting of temperature, hardness, composition, crystal orientation, grain size, and residual stress.

25. An apparatus for calibrating a system for determining a material property value of a thin material over a range of thicknesses comprising:

means for generating an elastic stress wave in the material at a source location; and sensing the intensity of a signal generated by the elastic stress wave at a sense location positioned a known distance from the source location, for a plurality of known material property values and known material thicknesses means for selecting a feature from among the sensed signals which demonstrates minimal thickness dependence for the plurality of known material thicknesses;

means for applying the selected feature to the sensed signals to determine propagation time of the signals over the known distance; and means for generating a calibration curve to characterize the relationship between signal propagation time and material property value for the range of material thicknesses.

26. The apparatus of claim 25 wherein the means for generating an elastic stress wave comprises means for launching a laser beam at a surface of the material.

27. The apparatus of claim 26 further comprising means for exciting the elastic stress wave by an excitation technique selected from the group of excitation techniques consisting of point excitation, line excitation, arc excitation, semi-circle excitation, and ring excitation.

28. The apparatus of claim 26 wherein the means for launching the laser beam comprises means for launching the laser beam at top and bottom surfaces of the material simultaneously and for sensing at corresponding first and second sense locations.

29. The apparatus of claim 25 wherein the thin material comprises a semiconductor wafer.

30. The apparatus of claim 25 wherein the sensed signals comprise the intensity of the signal as a function of time and wherein means for selecting a feature comprises selecting a feature in the signals having a defined starting time and a defined duration.

31. The apparatus of claim 25 wherein the means for applying the selected feature to the sensed signals to determine propagation time comprises:

means for cross-correlating the selected feature with each signal to generate correlation data corresponding to each signal, for a plurality of discrete propagation time values, and means for determining the propagation time of the signal as the time where the selected feature best correlates with the signal.

32. The apparatus of claim 31 wherein the means for cross-correlating comprises:
means for computing a sum of products between the respective intensities of the selected feature and each signal to generate correlation data, for each of a plurality of time positions; and
means for fitting a polynomial to the correlation data for each signal.

33. The apparatus of claim 32 wherein the means for determining the propagation time of the signal comprises means for determining the relative peak of the polynomial to determine a corresponding propagation time value.

34. The apparatus of claim 25 wherein the means for generating a calibration curve further comprises:
means for fitting a polynomial to characterize the behavior of propagation time as a function of material property value for each material thickness;
means for comparing the polynomial to the determined propagation time data at each material property value to determine a residual value at each data point;
means for computing the standard deviation of the residual data which characterizes the effectiveness of the selected feature for each thickness;
means for computing the average standard deviation over all thicknesses.

35. The apparatus of claim 25 wherein the means for selecting a feature, means for applying the selected feature, and means for generating a calibration curve operate iteratively to determine an optimal selected feature for characterizing the sensed signals.

36. The apparatus of claim 35 wherein the means for generating a calibration curve further comprises:
means for fitting a polynomial to characterize the behavior of propagation time as a function of material property value for each material thickness;
means for comparing the polynomial to the measured propagation time data at each material property value to determine a residual value at each data point;
means for computing the standard deviation of the residual data which characterizes the effectiveness of selected feature.

37. The apparatus of claim 36 wherein the optimal feature is determined as the feature having the lowest standard deviation value.

38. The apparatus of claim 35 further comprising means for applying the optimal feature to the sensed signals to generate a calibration curve based on the optimal feature.

39. The apparatus of claim 25 further comprising:
means for generating an elastic stress wave in a material of unknown thickness and unknown material property value at a source location; and sensing the intensity of a measured signal generated by the elastic stress wave at a sense location positioned a known distance from the source location, following computation of the calibration curve,
means for applying the selected feature to the measured signal to determine propagation time of the measured signal;
means for applying the propagation time of the measured signal to the calibration curve to determine the corresponding material property value.

40. The apparatus of claim 39 wherein the means for applying the selected feature to the measured signal to determine propagation time comprises:

means for cross-correlating the selected feature with the measured signal to generate correlation data corresponding to each signal, for a plurality of discrete propagation time values; and
means for determining the propagation time of the signal as the time where the selected feature best correlates with the signal.

41. The apparatus of claim 25 further comprising, for a plurality of material thickness ranges, means for selecting a corresponding plurality of signal features and means for generating a corresponding plurality of calibration curves, each signal feature and calibration curve combination being applicable to at least one of the thickness ranges.

42. The apparatus of claim 25 wherein the material property comprises a property selected from the group consisting of temperature, hardness, composition, crystal orientation, grain size, pressure, and residual stress.

43. The apparatus of claim 25 wherein the means for generating an elastic stress wave comprises means for launching a laser beam at an edge of the material and for sensing at a sense location on a surface of the material.

44. A system for determining a material property value of a thin material over a range of thicknesses comprising:
means for generating an elastic stress wave in a material of unknown thickness and unknown material property value at a source location; and means for sensing the intensity of a measured signal generated by the elastic stress wave at a sense location positioned a known distance from the source location;
means for applying a selected feature to the measured signal to determine propagation time of the measured signal, the selected feature being determined by a calibration system comprising:
means for generating an test elastic stress wave in the material at a source location; and means for sensing the intensity of a test signal generated by the test elastic stress wave at a sense location positioned a known distance from the source location, for a plurality of known material property values and known material thicknesses;
means for selecting a feature from among the sensed test signals which demonstrates minimal thickness dependence for the plurality of known material thicknesses;
means for applying the selected feature to the sensed test signals to determine propagation time of the test signals over the known distance; and
means for generating a calibration curve to characterize the relationship between signal propagation time and material property value for the range of material thicknesses; and
means for applying the propagation time of the measured signal to the calibration curve to determine the corresponding material property value.

45. The system of claim 44 wherein applying the selected feature to the measured signal to determine propagation time comprises:
means for cross-correlating the selected feature with the measured signal to generate correlation data corresponding to each signal, for a plurality of discrete propagation time values; and
means for determining the propagation time of the signal as the time where the selected feature best correlates with the signal.

46. The system of claim 45 wherein the means for cross-correlating comprises:

means for computing a sum of products between the respective intensities of the selected feature and each signal to generate correlation data, for each of a plurality of time positions; and means for fitting a polynomial to the correlation data for each signal.

47. The system of claim 46 wherein determining the propagation time of the measured signal comprises determining the relative peak of the polynomial to determine a corresponding propagation time value.

48. The apparatus of claim 44 wherein the material property comprises a property selected from the group consisting of temperature, hardness, composition, crystal orientation, grain size, pressure and residual stress.

* * * * *